United States Patent Office 2,795,542
Patented June 11, 1957

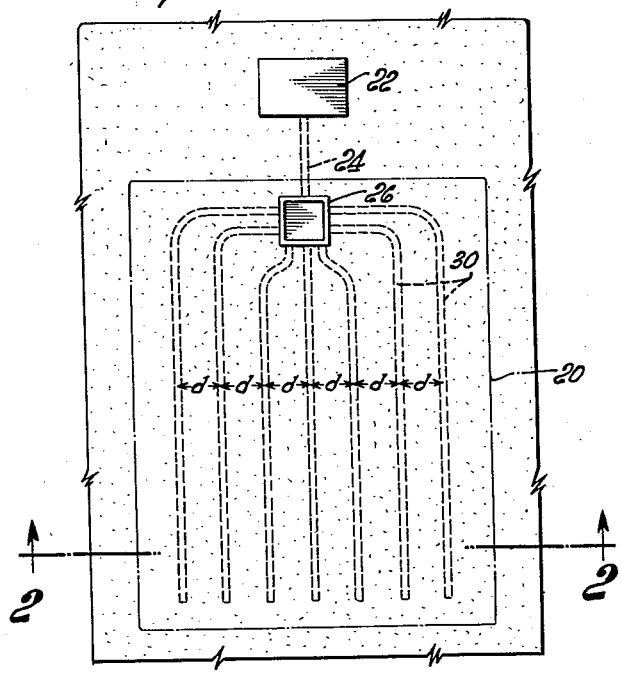
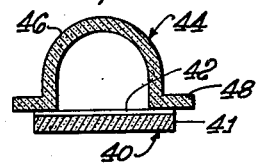
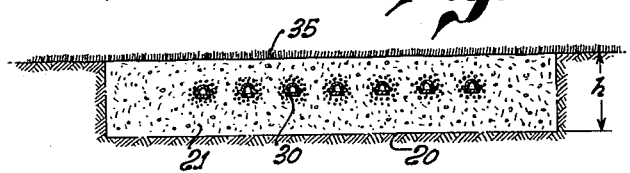
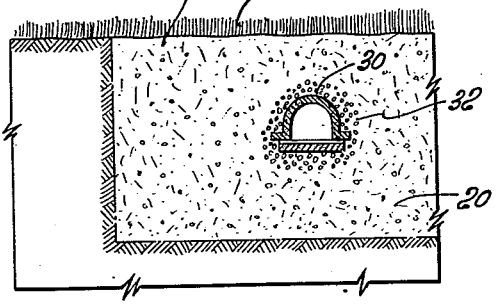
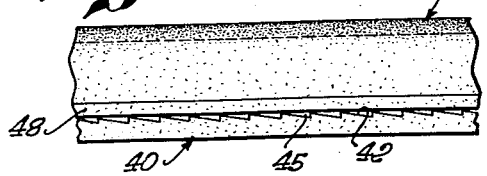

2,795,542

DISPOSAL OF SEPTIC TANK EFFLUENT AND THE LIKE

Frederick F. Horne, Robles Del Rio, and Thomas J. Edwards, South Pasadena, Calif.; said Edwards assignor to said Horne Application August 16, 1951, Serial No. 242,122

9 Claims. (Cl. 210—17)

This invention has to do generally with the problem of disposing of waste water, particularly water that carries an appreciable amount of organic material, whether in dissolved or suspended form.

Typical of the various kinds of fluid waste with which the invention may be concerned is the effluent from a conventional septic tank. Such effluent typically carries both dissolved and suspended organic materials, together with a great variety of bacterial life, much of which is potentially dangerous to health. For the sake of clarity, the invention will be described primarily with relation to the disposal of that particular type of waste, but without intending any limitation upon the scope of the invention, which relates also to other types of disposal that present related problems.

Conventional methods of disposing of septic tank effluents in disposal fields may be reasonably satisfactory under ideal conditions, but frequently give difficulty after a few years of operation, and may be virtually inoperative where soil conditions are not favorable.

A primary object of the present invention is the preparation and operation of disposal fields in a manner that makes their successful functioning largely independent of the nature of the surrounding soil. That is accomplished in part by utilizing more effectively than has previously been possible the natural capacity of plant life to remove water from the soil by absorbing it into the root system and releasing it to the atmosphere by evaporation and transpiration. By fully exploiting that plant function, whether by grasses, shrubs or trees, or by a combination of plant types, it has been found possible to dispose of the major portion of the water into the atmosphere so that only a minimum of water is required to drain away from the disposal field through the soil. In extreme cases, where the surrounding or underlying soil is particularly impervious to moisture, substantially all of the water may be removed from the disposal field through the surface.

A further, and related, object of the invention is to provide more favorable conditions throughout the volume of the disposal field for the growth of those aerobic microorganisms that decompose the organic content of the effluent. Such aerobic biochemical decomposition purifies the effluent by destroying those organic components that might produce odors or disease; and breaks down the solid organic suspended material into chemicals that are predominantly soluble or gaseous in nature. The stimulation of such aerobic disintegration of the organic content of the effluent greatly assists plant life both directly by providing plant foods in assimilable form, and indirectly by maintaining a suitably porous and granular physical condition of the soil.

The invention further provides improved distribution of the waste material to the disposal field, in a manner that permits maximum utilization of the entire surface area of the field and that protects the physical and biological condition of the field from damage. In particular, the distribution system minimizes the possibility of damage from local flooding of the field and tends to inhibit the blocking of the ground as by the formation of anaerobic slimes and by accumulation of effluent solids.

Those and other objects of the invention are accomplished by constructing the disposal field in a novel manner, embodying some or all of a number of carefully coordinated structural features that cooperate to produce the required results.

One of those features is the initial modification of substantially the entire body of ground comprising the disposal field. That body of ground is so modified as to provide air reservoirs distributed substantially throughout its volume, not merely in restricted portions. Those air reservoirs are preferably of a type that retain all or part of their charge of air even when the field is flooded with water. They are sufficiently small to resist clogging by any sediment normally carried by the effluent, and yet provide sufficient air capacity to contribute very significantly to the aeration of the soil.

A preferred manner of providing such air reservoirs within the body of the soil is excavate the soil from the entire area of the bed to a depth of a few feet; and to mechanically mix with the excavated soil, or with a portion of it, a granular inorganic additive material of a type that provides a very large number of microscopic air pockets opening inwardly from the surface of the granules and substantially isolated from each other. A preferred material of that type is natural pumice. Various artificial products having the described physical form of natural pumice may be used alternatively. Natural pumice, or one of the manufactured equivalents having the nature described, may be utilized in granular form having a mesh range from about one half inch down, even including a moderate proportion of dust. The finer the character of the initial soil, the larger may be the proportion of relatively fine pumice. The mixture of soil and additive is then returned to the disposal bed, the fluid distribution system to be described being preferably installed in the course of that operation.

The most effective proportion of additive depends upon the nature of the original soil both in and under the bed itself. In general, the volume of additive that is combined with excavated soil to fill the bed is between about one third and about one half of the volume of the bed to be filled. Under extreme conditions as much as two thirds of additive is found to be desirable. Such extreme conditions include surrounding formations that are nearly impervious to water seepage, so that maximum advantage must be taken of water transport up through the ground surface.

An important result of such modification of the entire body of the disposal bed is the creation throughout the volume of the bed of a reserve air capacity in the form of microscopic, mutually independent pockets that predominantly have only a single opening. Those pockets are normally filled with air, and have access to the atmosphere through the capillary pores of the ground, particularly after the described modification of the soil. Under normal conditions the air in those pockets is available for the support of aerobic bacteria in the soil under much the same conditions as air in the normal interstices between soil particles.

When the soil becomes temporarily wholly or partially flooded with water, whether from abnormal flow of effluent or from rain, or a combination of both, the intergranular interstices of the soil tend to become filled with water to the total exclusion of air. Under that condition, in disposal fields of previous type, the aerobic bacteria in the flooded portion of the soil are substantially wholly cut off from oxygen supply, the diffusion of air through standing ground water being ordinarily negligible, and whatever oxygen was originally dissolved in the effluent having been largely or wholly consumed by biological action in the septic tank. A result of that condition, in previous practice, is frequently to destroy the existing aerobic bacterial life in the soil, and to encourage the development of anaerobic micro-organisms that tend to produce odors and to block the pores of the ground with slime. Once that occurs it is difficult or impossible to restore the desired aerobic condition.

With a field that has been modified in the manner illustratively described, temporary flooding has a quite different effect. Soil water is incapable of penetrating the microscopic air pockets of the pumice-like soil additive, since the air in each pocket is trapped by the water and prevents the latter from entering. The pocket therefore remains substantially full of air. Although each individual pocket is extremely small, the total volume of all pockets is very appreciable, and provides a significant reservoir of air. The oxygen in that air is available for support of aerobic life in the soil during periods of temporary flooding, and enables that life to survive such periods without damage and even to profit from the redistribution of nutrients that accompanies such flooding action. When the water is removed, air is again drawn from the surface through the normal pore structure of the soil, and replenishes the oxygen content of the air reservoirs.

Such action of the described soil additive in preserving the aerobic biological life in the soil is a major factor in providing rapid and effective decomposition of organic content of the effluent. The rate of discharge of effluent to the disposal field is necessarily variable, and may well involve peak rates of flow that inevitably cause some flooding of the field. With adequate and well distributed air reservoirs throughout the body of the field, that is of little consequence and merely serves to distribute the waste liquid more widely through the field. The solid content of the effluent, which can be transported through the soil only a short distance in its initial state, must be broken down in the immediate vicinity of the distribution lines. But it is just there that previous practice encounters the greatest difficulty in maintaining aerobic activity, due in large part to the frequent flooding. When anaerobic life takes over, reducing aerobic activity, there is a tendency to seal the earth pores with slime, further inhibiting distribution of the water borne solids. Accumulation of those solids may then relatively quickly seal up the system, often virtually stopping even the flow of water.

That difficulty is overcome by the present invention primarily by maintaining vigorous aerobic activity throughout the field. Even in the immediate vicinity of the distribution lines, where sliming is ordinarily a serious problem, the present invention is successful in maintaining strong aerobic activity. The solids are thereby decomposed at fast as they are delivered from the distribution lines, and are broken down into soluble components or into suspended matter sufficiently fine to penetrate the ground to an appreciable extent. In either case, completion of the decomposition can take place within a relatively wider volume surrounding the distribution lines. By initially preventing any dense accumulation of solids at any point in the system, the strong aerobic activity preserves the very conditions upon which it is dependent for healthy survival.

In maintaining healthy aerobic life in the soil, the presence of the described additive tends to preserve also the porous capillary structure of the soil. The production of such capillary structure is an important ancillary function of the described modification of the entire body of the soil. Particularly in dense and inherently non-porous soils, that modification effectively breaks up the soil; and the granular nature of the additive, quite apart from its inherent air storage capacity, tends to prevent the soil from returning to its initial compacted condition. The granularity of the additive may be said to produce a suitable porosity by preserving the aerobic biology in the soil. That maintenance of favorable physical structure in the soil is of vital importance in facilitating water transport by capillary action throughout the volume of the disposal bed, and in further strengthening, in turn, the growth of aerobic microorganisms.

All of those actions combine to produce extremely favorable conditions for the growth of plants. In particular, the root systems of the plants tend to become widely and uniformly distributed throughout the modified body of the disposal field in condition to absorb moisture with maximum effectiveness. With water transport through the soil facilitated by improved soil porosity, there is less tendency for roots to congregate in the immediate vicinity of the distribution lines. Moreover, the improved permeability of the soil that results from the described modification tends to avoid penetration by frost, so that, for example, the distribution lines can feasibly be located closer to the ground surface in cold climates than would otherwise be possible. A further important advantage of maintaining soil porosity, and particularly of maintaining free access for water between the distribution lines and the surrounding soil, is the relative ease with which the entire system may be chemically treated, as by flowing suitable chemical solutions into the distribution lines and thence into the soil.

A further feature of the invention concerns the distribution system by which effluent is delivered to, and distributed through the body of the disposal field. According to usual previous practice, an array of distribution lines fans out from one or more distribution boxes over the area of the field, usually running in parallel lines, or along contour lines if the ground has appreciable slope. Each line is ordinarily located in a trench from 1½ to 4 feet deep and of comparable width, and the lines, or trenches are spaced from 6 to 9 feet apart. A typical line comprises standard sections of 4 inch round section unglazed agricultural tile, with open joints ¼ to ½ inch wide between tile sections. Each line is usually laid in its trench surrounded by broken stone or heavy gravel to a radial distance of 9 to 15 inches surrounding the pipe.

In accordance with the present invention, distribution lines are laid directly in the modified soil of the disposal field, each line being preferably surrounded with a relatively thin layer of relatively coarse pumice, natural or artificial. Moreover, the distribution lines are buried only a few inches below the surface of the ground, so that the effluent may have maximum access to the ground surface and to the roots of plants. A further, and particularly important advantage of that location of the lines is that the soil front through which the effluent enters the ground is close to the ground surface where air has ready access.

The distribution lines may comprise drain tile or other appropriate material. Such lines are preferably constructed with outlet apertures that are substantially uniformly distributed along their length, in contrast to the previous practice of relatively large and widely spaced apertures formed by open joints between tile sections. As a result, the effluent enters the ground uniformly along the length of the line, instead of being "dumped" at spaced intervals. Moreover, the apertures in the lines are sufficiently small that a surge of effluent is distributed along substantially the entire length of the line, and enters the ground gradually. In previous practice, with relatively large spacing between tile sections, and with the tile laid in large trenches of gravel, the effluent tended to flood one portion of the trench and leave the other portions dry.

The relatively thin layer of pumice gravel that surrounds each line in accordance with the present invention is sufficient to protect the apertures in the conduit wall from being clogged with soil, and provides adequate storage volume to receive abnormal surges of effluent; but, when flooded by such a surge, is relatively quickly cleared of water again, since the limited volume can readily be absorbed into the modified soil of the surrounding bed.

Moreover, such temporary flooding does not destroy aerobic lift that is already established, since the pumice of the gravel layer provides an air reservoir in much the same manner already described with special reference to the air cells distributed throughout the bed. Due to that air reservoir which is in the immediate vicinity of the distribution lines, which reservoir is particulary effective because located near the ground surface, the solid content of the effluent is immediately attacked by aerobic bacteria as soon as it leaves the distribution line, and is thereby broken down into material that can be transported by the effluent farther into the body of the field. The preservation of such energetic aerobic action in the immediate vicinity of the lines is one of the primary objects of the invention. That function protects the lines from being rendered progressively useless, as in previous practice, by accumulation of undigested solids and anaerobic slimes in the relatively deep and poorly aerated mass of gravel around each line. With the preferred manner of construction the filtering action that inevitably takes place at the front where the effluent enters the ground is prevented from clogging the flow, since rapid aerobic decomposition of the deposited material maintains an equilibrium condition. A clear understanding of the invention and of its further objects and advantages will be had from the following description of certain specific illustrative manners of carrying it out. In the accompanying drawings, which form a part of that description:

Fig. 1 is a schematic plan of an illustrative layout of distribution lines in accordance with the invention;

Fig. 2 is a section on line 2—2 of Fig. 1;

Fig. 3 corresponds to a portion of Fig. 2 at enlarged scale; and

Fig. 4 is a fragmentary elevation and Fig. 5 a transverse section of a preferred type of conduit structure.

In the illustrative showing of Figs. 1–3, the numeral 20 represents the boundaries of the body of the disposal field or bed. That boundary may be of any convenient shape, and is shown rectangular in plan for illustration only. The depth of the bed, represented at $h$ in Fig. 2, is preferably about 18 inches, but may vary from about one foot to three or four feet in accordance with special conditions. Throughout the volume of the bed 20 the soil is modified, as already described, by addition of a suitable granular material capable of functioning as an air carrier and of preserving its charge of air even when immersed in water. Such modified soil is represented for example, at 21. Effluent from the septic tank or other source of waste fluid, represented schematically at 22, may be carried to the field in a conduit of any convenient type. Such a conduit is represented at 24, leading from source 22 to a distribution box 26, which may be of conventional type.

An array of distribution lines is represented at 30, leading from box 26 to various portions of the field. Those lines are spaced as uniformly as conditions permit by a distance, represented by $d$ in Fig. 1, that is preferably within the range between two and four feet. The several distribution lines are preferably laid directly in the body of the field, as represented in Figs. 1–3, rather than in special trenches, one for each line, as in previous practice. As shown best in Figs. 2 and 3, the lines 30 preferably lie in the upper half of the modified bed 20, and are thus relatively close to the surface of the ground. Each line comprises a conduit surrounded by a relatively thin layer 32 of granular material that is coarser than the additive used at 21. The granular material 32 is preferably of a mesh from about ⅜₆ to about ¾ inch, and the layer may be as thin as three or four times the average diameter of the granules. The granular layer 32, like the additive at 21, comprises an inorganic material having the above described physical structure of natural pumice.

That physical structure, characterized by very large numbers of microscopic dead-ended pores opening into the material, may be found, for example, in certain types of natural scoria, in processed diatomaceous earth from which the organic material has been oxidized, and in rock in which finely dispersed water has been expanded to form individual cavities. The result of dispersing any such material, or suitably divided natural pumice, throughout the body of the soil produces a composition that is not found in nature. In the substantially solid beds in which natural pumice occurs the above described advantages do not obtain. It is only after such natural pumice or equivalent additive has been dispersed in relatively finely divided form throughout the soil that the described action takes place and that the advantages of the invention result.

At 35 in Figs. 2 and 3 is represented a continuous planting of any suitable ground cover, shown illustratively as sod. Water from lines 30 is transported by capillary action through modified soil bed 21, and is absorbed by the root systems of ground cover 35. That moisture is carried upward through the ground surface and utilized by the plant, either for chemical combination in the process of photosynthesis or for transfer to the atmosphere by evaporation or transpiration from the plant leaves.

Figs. 4 and 5 represent a preferred type of conduit structure that may be made of tile, concrete, or other suitable material. A conduit base is shown at 40 in the form of a generally flat plate having parallel side edges 41 and having transverse corrugations 42 in its upper face. Those corrugations are typically from about ⅛ to about ¼ inch deep and are preferably of saw-tooth form as indicated. The conduit cover 44 is of inverted U-section, and as illustrated is semi-cylindrical. The side walls 46 of the cover rest directly upon corrugations 42 of base 40 near the longitudinal side edges 41 of the base. The valleys of the corrugations thus provide horizontal passages 45 through the conduit wall, through which liquid is delivered to the surrounding ground. Those passages are relatively closely spaced longitudinally of the conduit, and provide an even and uniform distribution of liquid to the ground. Moreover, the cross sectional area of those passages is sufficiently small per unit length of conduit, due to the limited depth of corrugations 42, that only a portion of the liquid can escape from any one section of the conduit, insuring distribution of effluent over substantially the entire length of each line.

Longitudinal, outwardly directed flanges 48 of cover member 44 extend well beyond the side edges 41 of the base and thereby overhang apertures 45, protecting those apertures from any possibility of being accidentally filled by loose soil. Corrugations 42, in addition to forming passages 45, have the useful function of breaking up the flow of effluent within the conduit and trapping the larger particles of solid matter that may be carried in it.

We claim:

1. In a disposal field for septic tank effluent and the like, which field comprises a body of soil and distribution means for conducting the effluent into the body of soil; the improvement which comprises a granular inorganic substance distributed through said body of soil, said granular substance having the physical nature of natural pumice and being characterized by presence of a very large number of effectively blind microscopic pores that open inwardly from the surface of the granules and that retain a charge of air upon submergence of the granules in water.

2. In a disposal field for septic tank effluent and the like, which field comprises a body of soil and distribution means for conducting the effluent into the body of soil; the improvement which comprises granular natural pumice distributed through said body of soil.

3. In a disposal field for septic tank effluent and the like, which field comprises a body of soil and distribution means for conducting the effluent into the body of soil; the improvement which comprises granular natural pumice distributed through said body of soil continuously from the soil surface to a depth of from about one foot to about four feet.

4. In a disposal field for septic tank effluent and the like, which field comprises a body of soil and distribution means for conducting the effluent into the body of soil; the improvement which comprises granular natural pumice distributed through the body of soil, said pumice comprising between about one third and about two thirds of the volume of the body of modified soil.

5. In a disposal field for septic tank effluent and the like, which field comprises a body of soil, a system of distribution lines for conducting the effluent into the body of soil, and a layer of granular material between each distribution line and the surrounding soil; the improvement which is characterized by the fact that said layer consists essentially of granular natural pumice of a screen size between about 3/16 inch and about 3/4 inch.

6. In a disposal field for septic tank effluent and the like, which field comprises a body of soil, a system of distribution lines for conducting the effluent into the body of soil, and a layer of granular material between each distribution line and the surrounding soil; the improvement which comprises granular natural pumice distributed through the body of soil, said improvement being further characterized by the fact that said layer consists essentially of granular natural pumice of a screen size between about 3/16 inch and about 3/4 inch.

7. The method of disposing of effluent from a septic tank or the like, which comprises distributing said effluent in a disposal field the body of which comprises an intimate mixture of soil and a granular inorganic substance which has the physical nature of natural pumice and which is characterized by presence of a very large number of effectively blind microscopic pores that open inwardly from the surface of the granules and that retain a charge of air upon submergence of the granules in water.

8. The method of disposing of effluent from a septic tank or the like, which comprises distributing said effluent in a disposal field the body of which comprises an intimate mixture of soil and granular natural pumice.

9. The method of disposing of effluent from a septic tank or the like, which comprises distributing said effluent in a disposal field the body of which comprises an intimate mixture of soil and granular natural pumice, said pumice comprising from about one third to about two thirds of the volume of the mixture.

References Cited in the file of this patent

UNITED STATES PATENTS

| | | |
|---|---|---|
| 681,884 | Monjeau | Sept. 3, 1901 |
| 933,121 | Schofield | Sept. 7, 1909 |
| 956,665 | Ashley | May 3, 1910 |
| 1,334,192 | Thomas et al. | Mar. 16, 1920 |
| 1,832,967 | Craig | Nov. 24, 1931 |
| 1,950,841 | Crawford | Mar. 13, 1934 |
| 2,240,859 | Rice | May 6, 1941 |
| 2,536,196 | MacLeod | Jan. 2, 1951 |

OTHER REFERENCES

Industrial Minerals and Rocks (2nd ed.), Seeley W. Mudd Series (1949), pub. by the American Institute of Mining and Metallurgical Engineers, N. Y., page 752 cited.

U. S. Dept. of Agriculture Farmer's Bulletin No. 1227, pages 34–42.